United States Patent
DeYoung et al.

(10) Patent No.: US 7,721,099 B2
(45) Date of Patent: May 18, 2010

(54) SECURING ACCESS TO DOCUMENTS WITHIN MULTI-FUNCTION DEVICES

(75) Inventors: Dennis C. DeYoung, Webster, NY (US); Devin J. Rosenbauer, Butler, PA (US)

(73) Assignee: Xerox Corporation, Norwalk, CT (US)

( * ) Notice: Subject to any disclaimer, the term of this patent is extended or adjusted under 35 U.S.C. 154(b) by 1202 days.

(21) Appl. No.: 11/291,650

(22) Filed: Dec. 1, 2005

(65) Prior Publication Data

US 2007/0136588 A1 Jun. 14, 2007

(51) Int. Cl.
*H04L 9/32* (2006.01)
*G06F 17/00* (2006.01)
*G09C 3/00* (2006.01)

(52) U.S. Cl. .......................... 713/171; 700/235; 380/55
(58) Field of Classification Search ................. 713/171; 700/235; 380/55
See application file for complete search history.

(56) References Cited

U.S. PATENT DOCUMENTS 5,444,779 A * 8/1995 Daniele ....................... 399/366
6,188,766 B1 * 2/2001 Kocher ........................ 380/246
6,823,075 B2 * 11/2004 Perry .......................... 382/100
6,886,863 B1 * 5/2005 Mowry et al. ................. 283/72
6,970,259 B1 * 11/2005 Lunt et al. .................. 358/1.14
7,394,573 B1 * 7/2008 Goldberg et al. ........... 358/3.28
2003/0161475 A1 * 8/2003 Crumly et al. .............. 380/280
2004/0061327 A1 * 4/2004 Hilton et al. .................. 283/72
2005/0038756 A1 * 2/2005 Nagel .......................... 705/76
2006/0288236 A1 * 12/2006 McCue ....................... 713/193
2006/0290970 A1 * 12/2006 Nagarajan .................. 358/1.15

* cited by examiner

*Primary Examiner*—Techane J Gergiso
(74) *Attorney, Agent, or Firm*—Richard H. Krukar; Kermit D. Lopez; Luis M. Ortiz

(57) ABSTRACT

A printer that prints encrypted information in a document can be the key authority for that document. A document containing encrypted information and a source reference can be printed by a printer associated with a key module. The key module contains the key for decrypting the information. A scanner scanning the document obtains the source reference and the encrypted information. The scanner can use the source reference to send a key request to the printer and the printer can respond with the appropriate key. A decryption module associated with the scanner can use the key to decrypt the information. The decrypted information can be incorporated into a second document that can be electronically stored or printed.

6 Claims, 3 Drawing Sheets

SECURING ACCESS TO DOCUMENTS WITHIN MULTI-FUNCTION DEVICES

TECHNICAL FIELD

Embodiments relate to secure documents, encryption, and decryption. Embodiments also relate to printing and scanning documents. Embodiments additionally relate to producing a document containing decrypted information from a document containing encrypted information printed by an original printer and from a key obtained from the original printer.

BACKGROUND

Documents hold information and transferring documents transfers information. One of the problems with standard documents is that anyone obtaining the document, or a copy of the document, gains access to the information. The solution to this problem has been to encrypt documents or parts of documents. The encrypted information could be recovered with a key. In the loosest sense, a key is a piece of information that is used to decrypt encrypted information. In the past, the key was an algorithm or recipe. Modernly, encryption and decryption algorithms are widely known and the key is a very large number. Those skilled in the arts of encryption or secure communications are aware of a large number of encryption and decryption techniques and algorithms.

There are a variety of ways to include encrypted information in a document. One method is to simply encrypt the information and then print it as ciphertext. A bar code can be used. Steganography, in which information is hidden in a document, can also be used. Dataglyphs®, from Xerox, or similar technologies can be used to embed information in an image.

A receiver can't decrypt encrypted information without the key. As such, keys must be distributed. Keys and encrypted information must be distributed separately because anyone who has both can obtain the information. As such, various key exchange methodologies have been implemented. Key exchange methodologies are used to distribute keys. Those skilled in the arts of encryption or secure communications are aware of a large number of key exchange methodologies. For example, certificate authorities such as VeriSign and Thawte disseminate encryption and decryption keys to Internet users.

The Internet, however, is used for distributing electronic documents. There is also a need for paper documents because electronic documents are believed to be too transient or untrustworthy. For example, most experts find electronic voting to be untrustworthy without a paper trail. At the same time, a ballot is supposed to be secret. Therefore, paper ballots used in association with electronic voting systems exemplify one need for an encrypted paper document. Those skilled in the art of security documents are aware of many different applications calling for documents containing encrypted information.

Given printed documents with encrypted information, a key exchange technique is needed. An internet style technique with centralized certificate authorities is one possibility. Any type of centralized authority, however, immediately presents all the well understood problems inherent in every centralized system. Those problems include requiring permission from the authority before producing documents or decrypting information. Furthermore, all activity is governed by the procedures and failings of the central authority. Yet another argument is that a central authority controlling aspects of printed documents will have power over those documents and the users of those documents for the life of the documents. In many environments, such power is a liability. A need therefore exists for systems and methods for printing documents containing encrypted information and using those documents without having a centralized certificate authority.

BRIEF SUMMARY

Aspects of the embodiments address limitations and flaws in the prior art by making a printer that prints encrypted information in a document, the key authority for that document.

It is therefore an aspect of the embodiments to provide a printer that prints a document containing a glyph and a source reference. The printer is connected to a communications network and the source reference can be used to send a message to the printer using the communications network. The glyph contains encrypted information. The printer is associated with a key module. The key module contains keys. One of those keys is a glyph key that can be used to decrypt the encrypted information. The source reference contained in the document can be clearly printed, hidden, or encrypted, perhaps within a glyph.

It is also an aspect of the embodiments to supply a scanner that is also connected to the communications network. The scanner can scan the document and thereby obtain the source reference and the encrypted data. The scanner has a key fetch module that can obtain the glyph key from the printer. The key fetch module uses the communications network to send a key request to the printer and the printer can respond with the glyph key.

It is another aspect of the embodiments that a decryption module associated with the scanner can use the glyph key to decrypt the encrypted information. The decrypted information than can be incorporated into a second document. The second document can be stored on a storage device, such as a disk drive, if it is an electronic document. The second document can also be a printed document.

It is an aspect of certain embodiments that the scanner and the decryption module are part of a multi-function device. Similarly, a second multifunction device can include the printer, and the key module. Multi-function devices in general can contain a number of subsystems including scanners, printers, storage devices, key modules, key fetch modules, and decryption modules.

It is also an aspect of certain embodiments that the scanner, printer, and communications network use Internet Protocol, as widely defined by international standards, for sending messages such as key requests and responses. Higher level protocols such as Hypertext Transport Protocol or Simple Mail Transport Protocol can also be used.

BRIEF DESCRIPTION OF THE DRAWINGS

The accompanying figures, in which like reference numerals refer to identical or functionally similar elements throughout the separate views and which are incorporated in and form a part of the specification, further illustrate the present invention and, together with the background of the invention, brief summary of the invention, and detailed description of the invention, serve to explain the principles of the present invention.

DETAILED DESCRIPTION OF THE INVENTION

The particular values and configurations discussed in these non-limiting examples can be varied and are cited merely to illustrate embodiments and are not intended to limit the scope of the invention.

Figure 1:
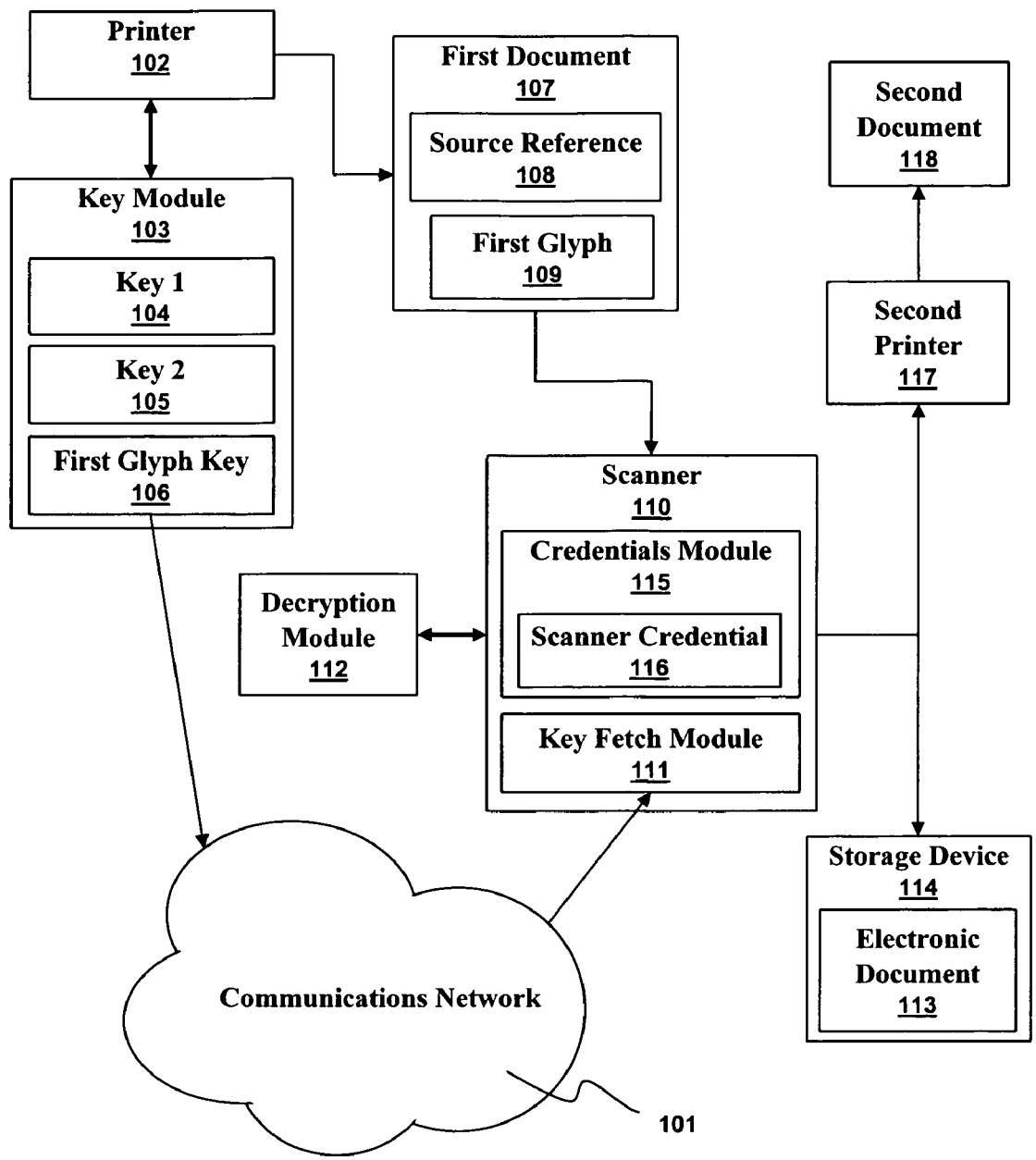
FIG. 1 illustrates a high level block diagram of a system that can produce documents containing encrypted information, obtain decryption keys, and produce secondary documents containing decrypted information in accordance with aspects of the embodiments.

FIG. 1 illustrates a high level block diagram of a system that can produce documents containing encrypted information, obtain decryption keys, and produce secondary documents containing decrypted information in accordance with aspects of the embodiments. A printer 102 produces a first document 107 that contains a source reference 108 and a first glyph 109. The first glyph 109 contains encrypted information (not shown) that can be decrypted with a first glyph key 106. The first glyph key 106 is one of possibly many keys, such as key 1 104 and key 2 105, held in a key module 103 that is associated with the printer 102.

A scanner 110 can scan the first document 107 to obtain the source reference 108 and the first glyph 109. Using its key fetch module 111, the scanner 110 can use the source reference 108 to send a key request to the key module 103 associated with the printer 102. Similarly, it can send the key request to the printer 102 which can obtain keys from the key module 103. The response to the key request can give the first glyph key 106 to the scanner 110.

A communications network 101 can carry the key request and the response. In certain embodiments, the communications network 101 can be the Internet. In such a case, the source reference can be the printers internet address, uniform resource locator, or similar reference.

A key request can include a scanner credential 116 from a credentials module 115 in the scanner 110. A credential is useful because it can be used to ensure that only certain scanners can decrypt the encrypted information. For example, a printer in an embassy can respond to key requests from scanners that are also in embassies. Those skilled in the arts of secure communications are familiar with credentials. They similarly know of ways to produce, secure, validate and invalidate credentials.

After the scanner 110 obtains the first glyph key 106, it can use a decryption module 112 associated with the scanner 110 to decrypt the encrypted information. The decrypted information can be included in an electronic document 113 that can be stored in a storage device 114 or included in a second document 118 printed by a printer 117.

One alternative to including the credentials module 115 and the key fetch module 111 in the scanner 110 is to include them, jointly or separately, in the decryption module 112.

Figure 2:
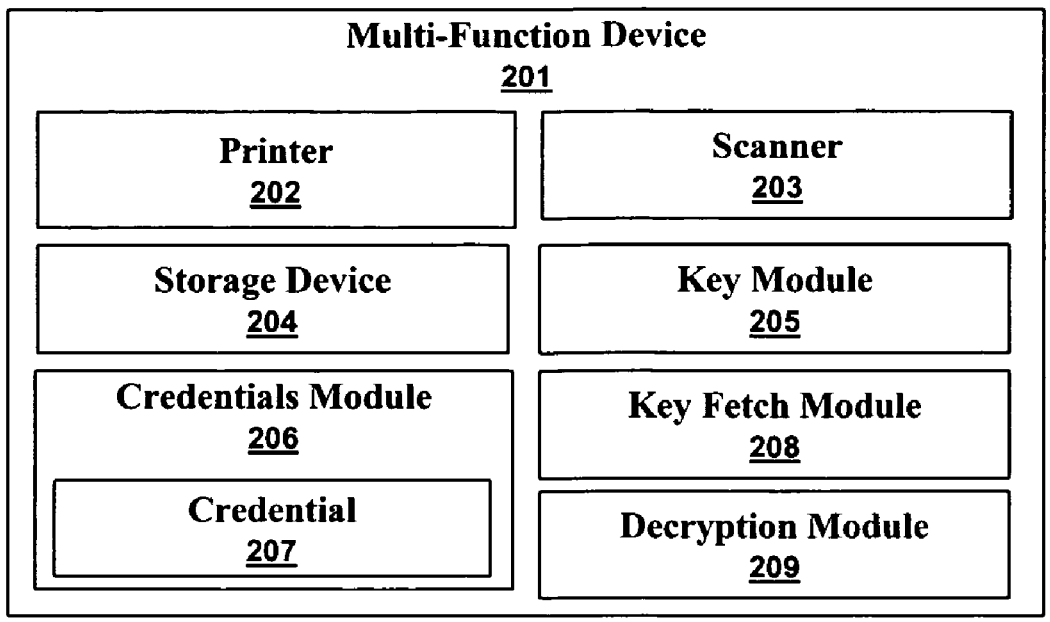
FIG. 2 illustrates a high level block diagram of a multifunction device in accordance with aspects of certain embodiments.

FIG. 2 illustrates a high level block diagram of a multifunction device (MFD) 201 in accordance with aspects of certain embodiments. The MFD 201 includes a printer 202, a scanner 203, a storage device 204, a key module 205, a key fetch module 208, a decryption module 209, and a credentials module 206 holding a credential 207. In practice, an MFD 201 can include all or some of the elements shown. For example, current technology supplies MFDs with just a printer 202 and a scanner 203.

A printer that produced a document can refuse to return a glyph key when the requesting MFD is not properly authorized. The credential held by the credentials module 206 can be used by a MFD 201 to establish proper authorization. Those skilled in the arts of secure computing, key exchange, or remote authorization know of many mechanisms by which a MFD, or a person using an MFD, can supply acceptable credentials to a key authority.

Figure 3:
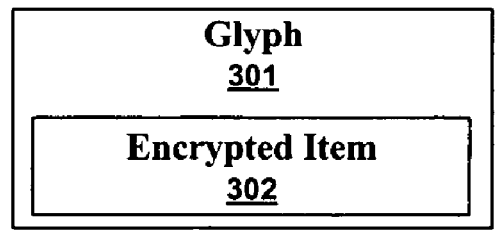
FIG. 3 illustrates a glyph containing an encrypted item in accordance with aspects of the embodiments.

FIG. 3 illustrates a glyph 301 containing an encrypted item 302 in accordance with aspects of the embodiments.

Figure 4:
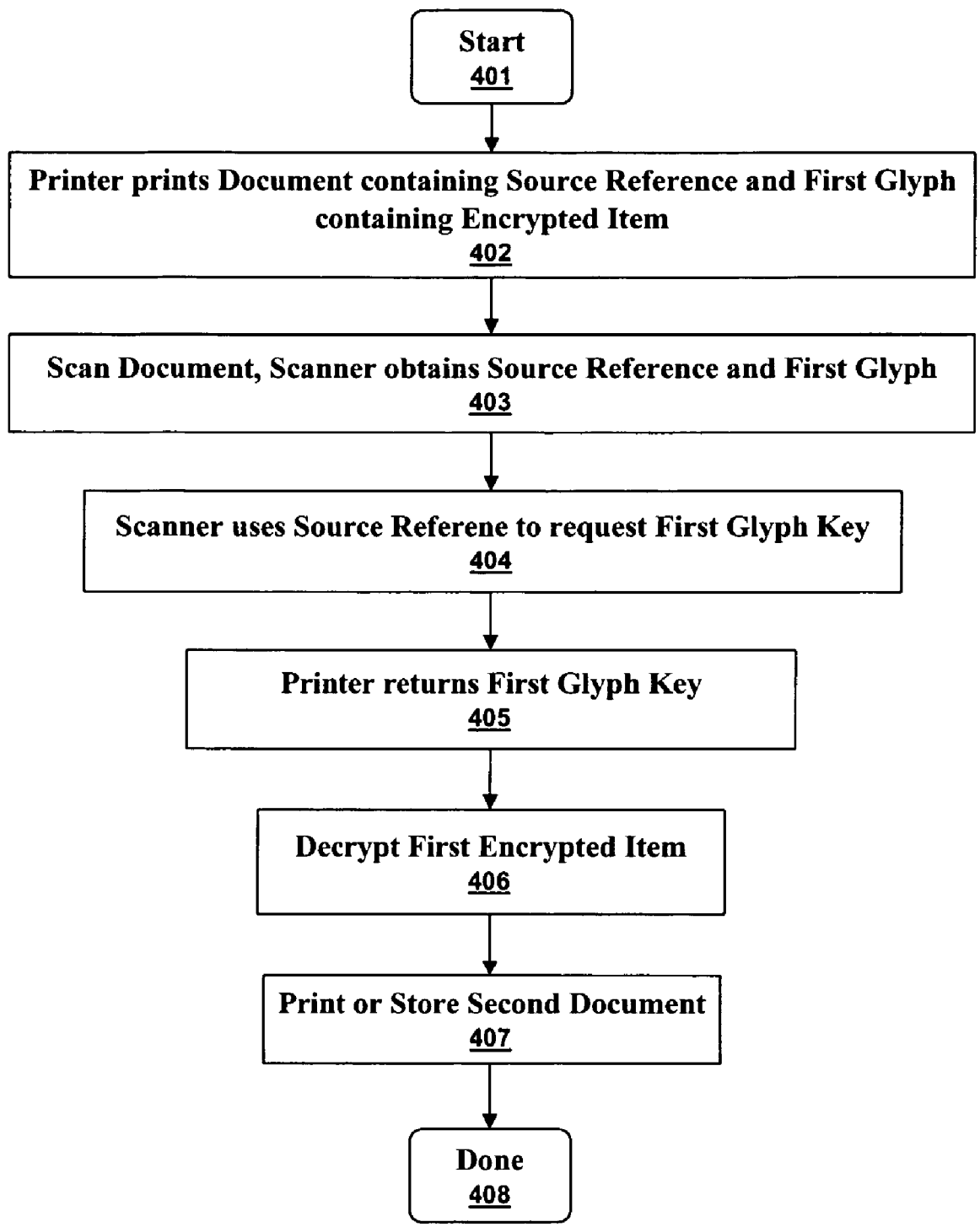
FIG. 4 illustrates a high level flow diagram of producing a document containing encrypted information, obtaining a decryption key, and producing a secondary document containing decrypted information in accordance with aspects of the embodiments.

FIG. 4 illustrates a high level flow diagram of producing a document containing encrypted information, obtaining a decryption key, and producing a secondary document containing decrypted information in accordance with aspects of the embodiments. After the start 401, a printer prints a document containing a source reference and a first glyph 402. The first glyph contains an encrypted item. A scanner scans the document and obtains the source reference and the first glyph 403 then uses the source reference to request the first glyph key 404. The printer returns the first glyph key 405 to the scanner where it is used the decrypt the first encrypted item 406. A second document containing the decrypted information can then be printed or stored 407 before the process is done 408.

Embodiments can be implemented in the context of modules. In the computer programming arts, a module can be typically implemented as a collection of routines and data structures that performs particular tasks or implements a particular abstract data type. Modules generally can be composed of two parts. First, a software module may list the constants, data types, variable, routines and the like that can be accessed by other modules or routines. Second, a software module can be configured as an implementation, which can be private (i.e., accessible perhaps only to the module), and that contains the source code that actually implements the routines or subroutines upon which the module is based. Thus, for example, the term module, as utilized herein generally refers to software modules, hardware modules, or implementations thereof. Such modules can be utilized separately or together to form a program product that can be implemented through signal-bearing media, including transmission media and recordable media.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A system comprising:

a printer and a scanner connected to a communications network;

a first document printed by the printer wherein the first document comprises a source reference and a first glyph and wherein the first glyph comprises a first encrypted item;

a key module associated with the printer and storing one or more keys and wherein at least one of the one or more keys is a first glyph key a scanner comprising a key fetch module and a credentials module containing a scanner credential wherein the key fetch module sends the scanner credential to the key module, wherein the key module sends the first glyph key back to the key fetch module if and only if the scanner credential is a sufficient credential, wherein the scanner scans the document to obtain the source reference and the first encrypted item and wherein the key fetch module uses the source reference to obtain the first glyph key;

a decryption module associated with the scanner that can use the first glyph key to decrypt the first encrypted item to produce a first decrypted item; and an electronic document comprising the first decrypted item and a storage device adapted to store a multitude of electronic documents.

2. The system of claim 1 further comprising a multi-function device and wherein the multifunction device comprises the scanner and the decryption module.

3. The system of claim 1 wherein the communication network, the multifunction device, and the printer use Internet Protocol.

4. The system of claim 3 further comprising a second multi-function device and wherein the multifunction device comprises the key module and the printer.

5. The system of claim 1 wherein the scanner and the printer use Simple Mail Transport Protocol.

6. The system of claim 1 wherein the scanner and the printer use Hypertext Transport Protocol.

* * * * *